United States Patent
Li et al.

(10) Patent No.: US 8,532,061 B2
(45) Date of Patent: Sep. 10, 2013

(54) ADAPTIVE HANDOVER MECHANISM FOR HETEROGENEOUS WIRELESS NETWORK

(75) Inventors: Zhi Li, Martinez, CA (US); Raghvendra Savoor, Walnut Creek, CA (US); Jian Li, San Ramon, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 995 days.

(21) Appl. No.: 12/335,641

(22) Filed: Dec. 16, 2008

(65) Prior Publication Data

US 2010/0150102 A1 Jun. 17, 2010

(51) Int. Cl.
*H04W 4/00* (2009.01)

(52) U.S. Cl.
USPC ............ 370/332; 370/431; 370/329; 455/436

(58) Field of Classification Search
USPC .......................... 370/329, 332, 431; 455/436
See application file for complete search history.

(56) References Cited

U.S. PATENT DOCUMENTS

| | | | |
|---|---|---|---|
| 7,075,911 B2* | 7/2006 | Bernhard et al. | 370/331 |
| 7,542,765 B2* | 6/2009 | Kwun et al. | 455/436 |
| 7,593,731 B2* | 9/2009 | Lim et al. | 455/436 |
| 2008/0014934 A1* | 1/2008 | Balasubramanian et al. | 455/434 |
| 2009/0040983 A1* | 2/2009 | Kim et al. | 370/331 |
| 2009/0088157 A1* | 4/2009 | Aaron | 455/436 |
| 2010/0297996 A1* | 11/2010 | Yokota | 455/436 |

* cited by examiner

*Primary Examiner* — Phuc Tran
(74) *Attorney, Agent, or Firm* — Turocy & Watson, LLP

(57) ABSTRACT

The claimed subject matter provides a system and/or a method that facilitates optimizing handover in connection with an access network. An access network can include at least one device exchanges data therewith, wherein the device communicates with at least one access station within the access network to exchange data. A rules engine can create a user-defined rule based upon at least one of a resource requirement for a device application or a user input related to a quality of service (QoS) experience with the device. The rules engine can enforce the user-defined rule to employ handover related to the device and at least one of an access station within the access network or a disparate access network.

19 Claims, 9 Drawing Sheets

US 8,532,061 B2

ADAPTIVE HANDOVER MECHANISM FOR HETEROGENEOUS WIRELESS NETWORK

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

In light of such technological advances, people in general tend to be more and more concerned about being connected and/or available for various communications such as cell phone calls, text messages, emails, instant messages, land line phone calls, voice mails, etc. In general, there are a vast number of manners in order to communicate over access networks with handheld devices. Such access networks can include, for example, the Internet, a Wi-Fi network, a network, a cellular network, a wireless mesh network, etc. In order to optimize service and signaling within such access networks, various handover or handoff mechanisms can be utilized. Handover or handoff mechanisms can manage switching from one access station to another in access networks and/or switching from one access network to another type of access interface. Traditional handover methods can include a network-based approach and a device-based approach.

In a network-based handover mechanism, the cellular network system can monitor signal quality of individual connections and the distribution of multiple connections among neighboring base stations. The optimization goal of network-based handover can be to improve network throughput and efficiency. In a device-based handover mechanism, the terminal device (e.g., handheld device, etc.) can monitor multiple radio signals from neighboring base stations or multiple access interfaces from different access networks. The device can also make decision when to switch from one base station to another or from one access network to another access interface. The optimization goal of device-based handover can be to improve on-going session quality, reduce connection fees, etc.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate customizing handover associated with a device and a network based upon a user preference or an application requirement. A rules engine can receive user input representative of an experience with a device and connectivity with an access station and/or an access network, wherein the user input can be incorporated into a user-defined rule that can enforce handover policies (e.g., switching connectivity with a device and at least one of an access network or an access station). In addition, the rules engine can create a rule for handover policies based upon an application resource requirement. In general, the rules engine can allow user-customized rules for handover that can take in account personal experiences with the device connectivity with an access station, the device connectivity with an access network, or an application resource requirement. Additionally, the user-defined rules can be implemented as a handover policy as well as being combined with network-based handover rules, device-based handover rules, and/or any combination thereof.

Furthermore, the rules engine can include a conflict component that verifies user-defined rules in order to prevent errors, conflicts, and the like. The conflict component can test the user-defined rules as well as compare the user-defined rules with network-based rules, network requirements, device-based rules, device requirements, and/or previously created rules. The rules engine can further infer user-defined rules based upon historic data collected in relation to a user experience with the connectivity of the device and/or identified application resource requirements. Moreover, the rules engine can provide standardized templates with default settings, wherein the template can be edited via user input in order to create a personalized user defined rule that can be employed for handover policies. In other aspects of the claimed subject matter, methods are provided that facilitate inferring a user behavior or an application behavior in order to create a custom rule related to handover associated with a device and an access network.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
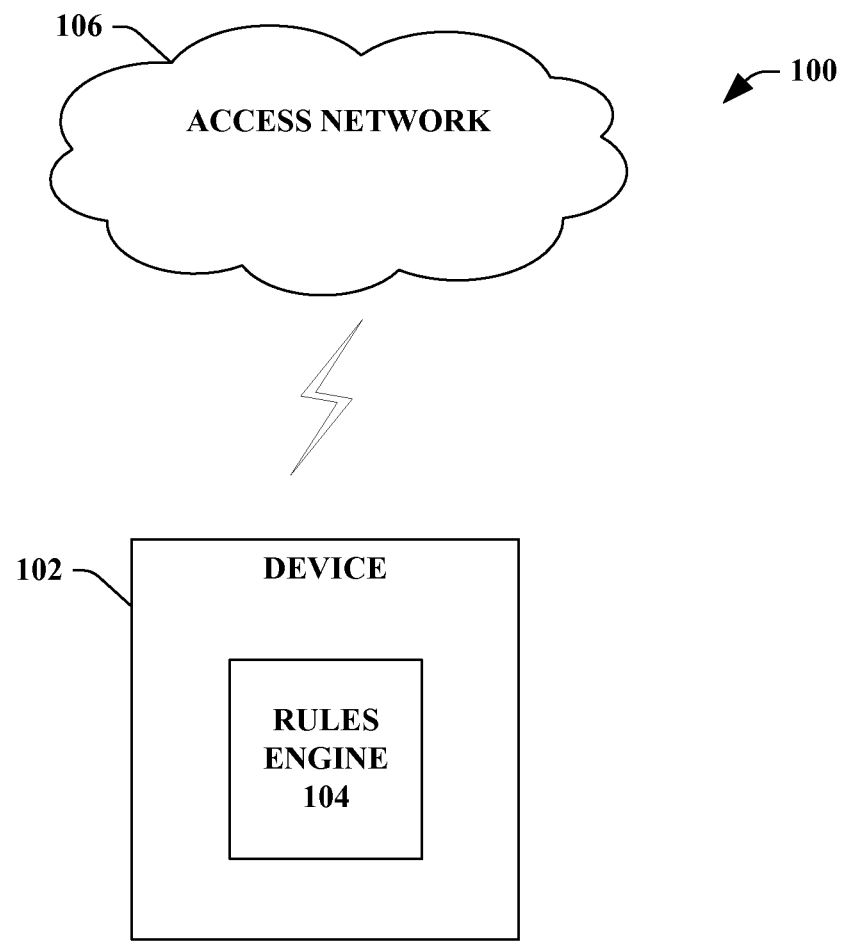
FIG. 1 illustrates a block diagram of an exemplary system that facilitates customizing handover associated with a device and a network based upon a user preference or an application requirement.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "template," "manager," "network," "profile," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates customizing handover associated with a device and a network based upon a user preference or an application requirement. The system 100 can include a device 102 that can communicate with an access network 106 in order to wirelessly exchange a portion of data (e.g., voice communication, data communication, web browsing, and the like). The device 102 can further include a rules engine 104 that can create user-defined rules based on user quality of service (QoS) experience or an application requirement, wherein such user-defined rules can provide personalized or application specific handover in connection with the access network 106. In general, the rules engine 104 can leverage the user-defined rule in order to provide handover or handoff between 1) the device 102 and the access network 106 or a disparate access network; and 2) the device 102 and an access station within an access network.

The access network 106 can be, but is not limited to being, a wireless network, a cellular network, a Wi-Fi, a WIMAX, a wireless mesh network, a home network, a hotspot, hybrid networks, multiple access interface networks, and/or any other suitable network that can enable data communication for the device 102. The access network 106 can utilize any suitable number of access stations within the specific network. For example, a wireless mesh network can include any suitable number of access stations. Thus, it is to be appreciated that handover or handoff can include transitioning between one access station and another within an access network (e.g., a first access station within access network A and a second access station within access network A) as well as transitioning between types of access networks (e.g., a first access network to a second access network). Moreover, the device 102 can be any suitable electronic device such as, but not limited to, a cellular phone, a mobile device, a portable digital assistant (PDA), a smartphone, a laptop, a gaming device, a portable gaming device, a media player, a portable media player, a web browser, a machine, a computer, a device with a processor and/or memory, a portable computing device, etc.

The rules engine 104 can optimize handoff or handover by allowing a user to incorporate personal experience or knowledge into creation of user-defined rules. In other words, typical handoff does not take into account of a user's preference or input (alone or in combination with default rules from service providers). The rules engine 104 provide a user customized and adaptive approaches for handover between access networks 106 and access stations within access networks 106. In general, a user can understand usage patterns, usage requirements, application performance, location experiences, quality of service (Qos) with geographic location, connection fees, coverage areas, etc. Moreover, QoS can represent quality-of-Service, wherein such QoS can refer to object performance metrics. For instance, network QoS can include latency, loss, jitter, etc. In another example, QoS can represent a user subjective perceptual QoS. With such personalized knowledge of his or her own access network 106 and device 102 (and related applications), the rules engine 104 can provide a dynamic and seamless manner in which handover can be managed while improving access network 106 performance. It is to be appreciated that the rules engine 104 can create user-defined rules based on any suitable number of criteria or factors.

For example, a user can create a user-defined rule based on a geographic location and a service plan (e.g., billing rate, etc.). A specialized handoff or handover rule can be employed for the user in which the user defines an access network and/or access station within a network that is preferred based on a defined geographic location. Moreover, the specialized handoff rule can be enforced based upon user preference in light of access network or station performance as well as billing rates or service plan. In particular, a user may wish to create a user-defined rule in which the device can utilize a home wireless network while the device is within geographic proximity of such network (e.g., and such home wireless network can include lower billing rates for data transfer, etc.).

It is to be appreciated that the application resource requirement can include a design resource requirement as well as a user experience identified resource requirement. For example, the design resource requirement can be identified by a manufacturer, designer, factory, user, enterprise, vendor, and/or any suitable entity that can identify a system requirement for the application. The user experience identified resource requirement can be identified based upon a user employment of the application on the device 102. Overall, application resource requirements can be, but are not limited to, signal-to-noise ratio (SNR), packet loss, security, memory, processor speed, connection type, etc.

In addition, the system 100 can include any suitable and/or necessary interface component (not shown), which provides various adapters, connectors, channels, communication paths, etc. to integrate the rules engine 102 into virtually any operating and/or database system(s) and/or with one another. In addition, the interface component can provide various adapters, connectors, channels, communication paths, etc., that provide for interaction with the rules engine 104, the device 102, the network 106, and any other device and/or component associated with the system 100.

Figure 2:
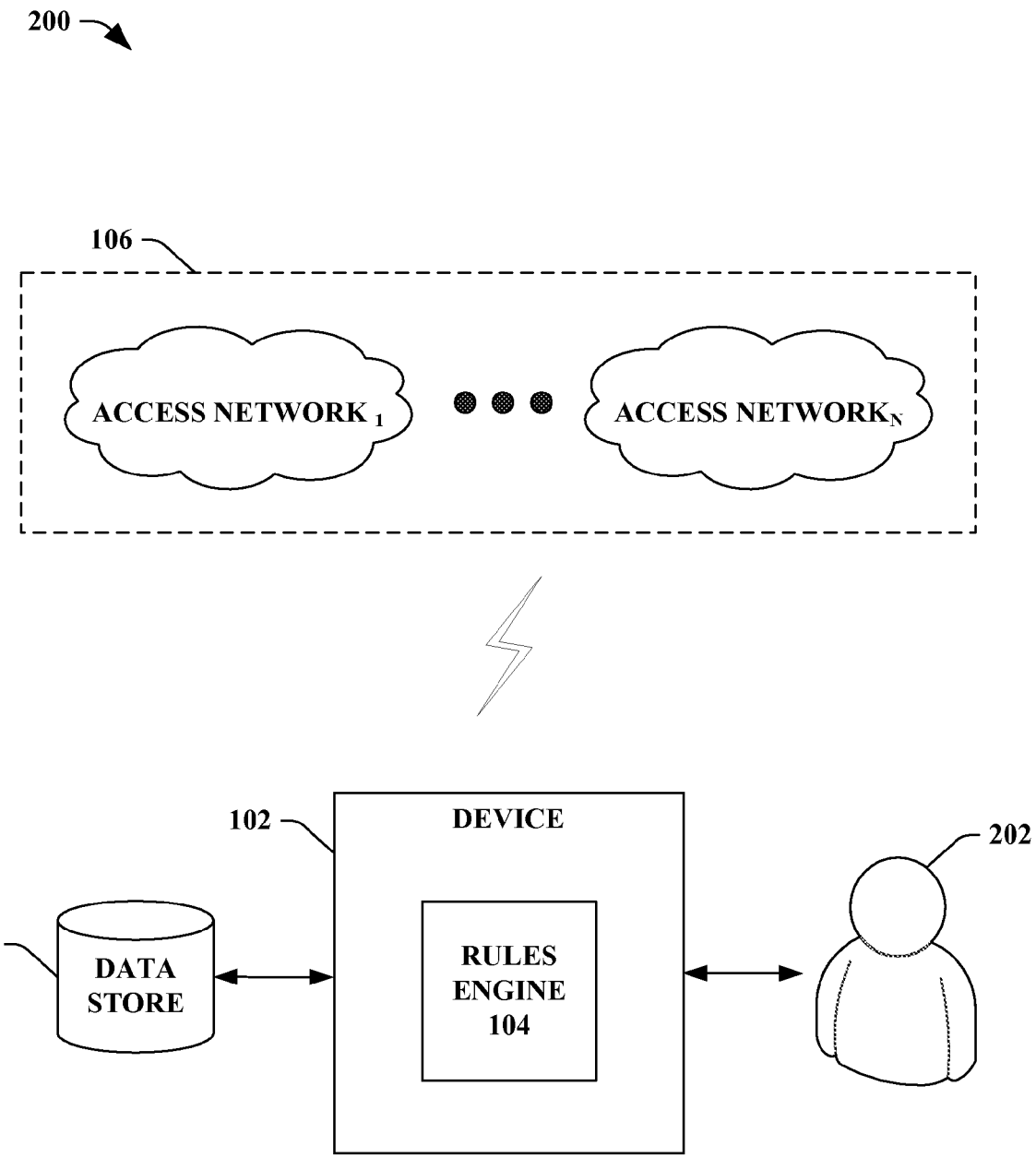
FIG. 2 illustrates a block diagram of an exemplary system that facilitates managing handoff between two or more access networks and a device based upon customized rules.

FIG. 2 illustrates a system 200 that facilitates managing handoff between two or more access networks and a device based upon customized rules. The system 200 can include the rules engine 104 that can optimize handoff and handover between 1) the device 102 and at least one access network 106; and/or 2) the device 102 and at least one access station within an access network. The rules engine 104 can receive input via a user 202, wherein the user 202 can create user-defined rules based upon an experience, application requirement, and/or any other suitable user provided information. By leveraging the user 202 to create user specific handover rules, the rules engine 104 can provide an efficient handover policy rather than enforcing a generalized rule which may not be satisfactory for the user 202.

As discussed, the rules engine 104 can create and employ user-defined rules for handover or handoff between the device 102 and at least one access network 106. It is to be appreciated that there can be any suitable number of access networks 106 in which the rules engine 104 can employ user-defined rules, such as access network $_1$ to access network $_N$, where N is a positive integer. Moreover, it is to be appreciated that the rules engine 104 can enforce user-defined rules for handoff in connection with any suitable number of access stations (not shown) within an access network, such as access station $_1$ to access station $_M$, where M is a positive integer.

In another example, the rules engine 104 can automatically evaluate the user 202 and create rules based on the user's tendencies, habits, geographic locations, service plans, data plans, carrier, etc. For example, a handover rule can be inferred based upon an evaluation of historic data specific to the user 202. In addition, such automatically created rule can be edited by at least one of the access network 106, the user 202, and/or any suitable combination thereof in order to provide a handoff rule that satisfies wireless needs.

The system 200 can implement a user customized adaptive handover approach based upon a technique that enables the user 202 to input preferences in handover choices alone or in combination to a default rule from a service provider (not shown). The system 200 can further include presentation component (discussed in more detail in FIG. 6) that provides user friendly interfacing to configure and/or compile such preference rules and application to the device 102 and/or the access network 106.

For example, the handover technique can be optimized in order to leverage available resources and requirements. The rules engine 104 can monitor multiple channel quality or multiple access interface types. The rules engine 104 can further identify on-going or potential applications on the device 102 (e.g., video services, phone calls, web browsing, file downloading/uploading, etc.). The applications can be mapped to potential network service quality of service (QoS) requirements such as latency, bandwidth, packet loss, etc. The various network connections' service quality can be inferred by the rules engine 104 basing on pervious or on-going monitoring results. Based upon the monitoring and/or the mapping, a list of connections that can satisfy the QoS requirement can be generated by the rules engine 104. The rules engine 104 can further identify a network connection based on a metric (e.g., low cost, location, services, service bandwidth, security, power consumption, etc.). For example, if the metric is lowest cost, the rules engine 104 can select an access interface with the least connection fee. The rules engine 104 can then invoke a switch to a new access station, base station, access interface and provision seamless (e.g., non-disruptive) service for on-going network connection. It is to be appreciated that the rules engine 104 can continuously evaluate network condition changes, user or device geographic location, and the like in order to identify an optimal access network and/or access station for the device 102.

In addition, the user can create user-defined rules for customized handover related to the device 102, the access network 106, and/or an access station. In general, the user 202 can understand QoS experiences in particular geographic locations (e.g., visited locations, frequent location, etc.) such as school campus, shopping malls, work place, commute routes, etc. Moreover, the user 202 understands requirements or desires for QoS levels at different locations for different applications, different phone numbers, and the like. The rules engine 104 can enable the user 202 to create or customize a set of rules for handover choices based on such personal knowledge and/or understanding of a relationship with the device 102. The following user-defined rule examples can be created or generated by the rules engine 104: 1) connect onto an enterprise WIFI network when located within a defined proximity of an office building; 2) connection onto a home WIFI network when located within a defined proximity of home; 3) avoid connection with a passing-by WIFI network during a commute between two locations; 4) connect to a public WIFI network in a verified location (e.g., shopping mall, coffee shop, bar, etc.) for non-sensitive application (e.g., category search, map direction guide, web surf, etc.); and/or 5) avoid connection onto a non-secure WIFI network by connecting to a cellular network for security sensitive applications (e.g., online banking, checking emails, business conference calls, etc.).

In another example, the user-defined rules created by the rules engine 104 via the user 202 input can be based on various criteria. For example, the user-created rules for handoff can relate to criteria such as, but not limited to, geographic location, application type, billing cost, service cost, billing or service cost at a location, billing or service cost at a location and wireless network, network bandwidth, QoS quality, QoS object performance metrics (e.g., loss, jitter, etc.), user subjective perceptual QoS, physical layer service quality (e.g., such as signal-to-noise ratio (SNR), etc.), handover quality and service impact with on-going applications, mobility of speed of wireless users, network traffic, cell site, wireless network coverage, channel security level, security settings, security requirements, power requirements (e.g., conserving battery power based on connecting with a lower power consuming network in comparison to another), comparison of service plans (e.g., data plan versus cellular plan, etc.), and/or any other suitable criteria a user can provide that relates to a personalized experience with the device 102.

The system 200 can further include a data store 204 that can include any suitable data utilized and/or accessed by the device 102, the rules engine 104, the access network 106, etc.

For example, the data store 204 can include, but not limited to including, user-defined rules, user specific device configurations (e.g., type of device, resources on device, memory, operating system, processor, applications, service plan, type of access network modes, device inputs, etc.), inferred rules, historic data related to QoS, historic data related to signal, historic data related to billing rates and geographic locations, historic data related to geographic locations and user experience, network-based handover techniques, device-based handover techniques, access network definitions, access station definitions, user profiles, application resource requirements, access network traffic, etc. Moreover, although the data store 204 is depicted as a stand-alone component, it is to be appreciated that the data store 204 can be a stand-alone component, incorporated into the device 102, the rules engine 104, the access network 106, and/or any suitable combination thereof.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 206 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
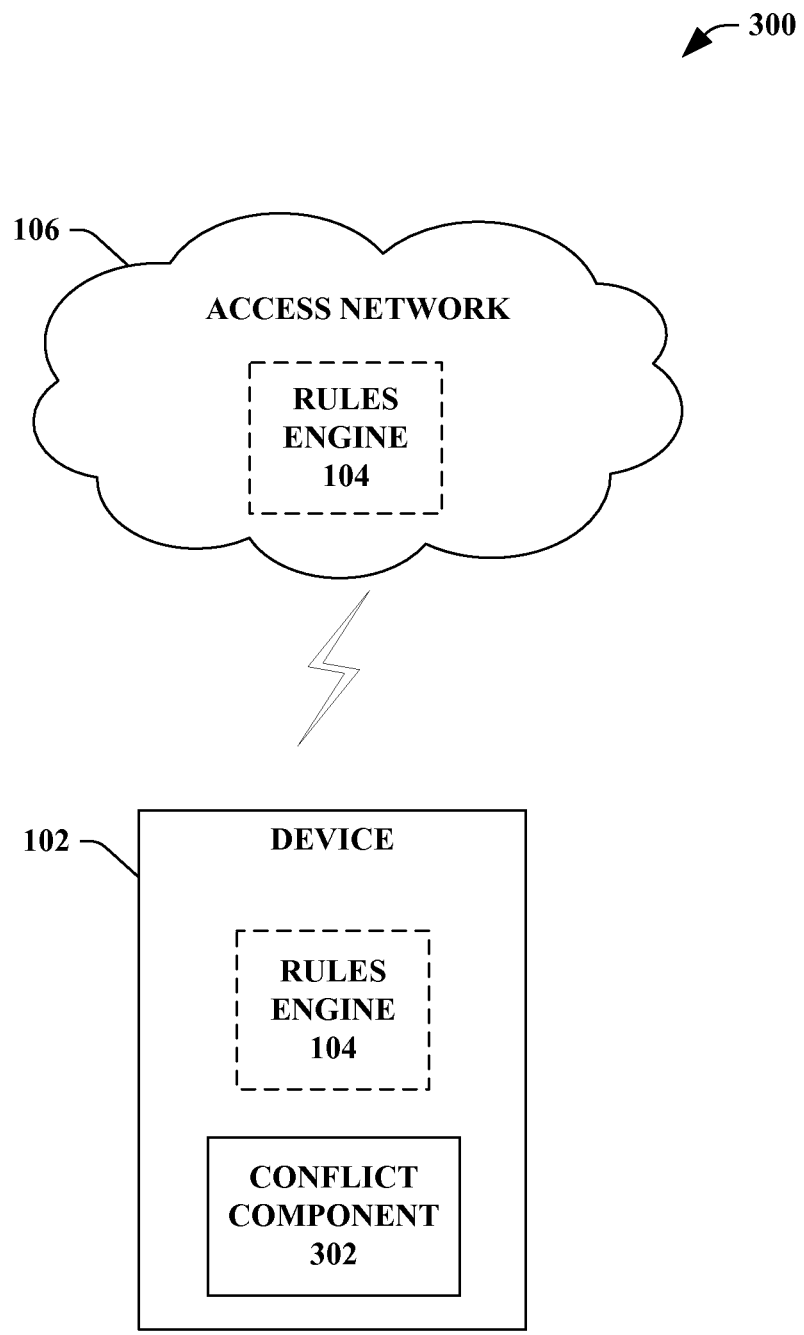
FIG. 3 illustrates a block diagram of an exemplary system that facilitates verifying customized rules in order to prevent conflicts or errors during handoff.

FIG. 3 illustrates a system 300 that facilitates verifying customized rules in order to prevent conflicts or errors during handoff. The system 300 can include the rules engine 104 that can enable user-defined rules or policies for handover or handoff in connection with the device 102. In particular, the rules engine 104 can allow a user to incorporate his or her experience or preferences with devices 102 and access networks 106 to be considered via a user-defined rule. Based on the user providing input on handover policies or rules, the device can be more customized to the user for an optimized handoff rather than enforcing rigid device-based handoff techniques and/or network-based handoff techniques.

For example, a user may wish to switch from a cellular network to a WIFI network based on billing rates and/or indication that maximum data per month is reached. In another example, the user can create a rule that utilizes a wireless network (e.g., voice over Internet protocol (VoIP), etc.) for social calls and a secured cellular network for business calls based on the communication of sensitive information. In still another example, a user can create a user-defined rule that ensures a mapping application utilizes a WIFI network based on large amount of data transfer. In another example, the user can create a user-defined rule that manages the device 102 in that battery life is conserved by limiting connections to networks and/or stations that are low in battery consumption. Moreover, it is to be appreciated that the employment of user-defined rules for handover or handoff can reduce power consumption based on the device not having to monitor different access interfaces to keep track of signal quality.

It is to be appreciated that the rules engine 104 can be incorporated into the device 102 (as depicted), a stand-alone component, incorporated into the access network 106, and/or any suitable combination thereof. For example, the rules engine 104 can be incorporated into the access network 106 and can be utilized by the device 102 (and, in turn, a user) via a web portal, the Internet, a web site, etc. In another example, the rules engine 104 can be an application or applet that can be downloaded and installed to the device 102. In still another example, the rules engine 104 can provide standardized templates to which a user can customized (discussed in more detail below).

The rules engine 104 can further utilize a conflict component 302. The conflict component 302 can monitor user-defined rules for verification against errors, service provider restrictions, conflicts, flaws, etc. The conflict component 302 can provide a sanity check as a user defines a rule or a set of rules, wherein a warning on conflicts or potential conflicts exist. Moreover, the conflict component 302 can identify flawed rules so the user can correct such errors or flaws in order to enable employment of the rules to the device 102, the access network 106, and/or an access station. It is to be appreciated that the conflict component 302 can verify the user-defined rules based upon evaluation of network policies, device policies, network requirements, device requirements, a test phase (e.g., utilizing the rule to identify potential errors, etc.), and/or existing rules (e.g., rules created by another user, rules previously employed, template rules, customized template rules, etc.).

Figure 4:
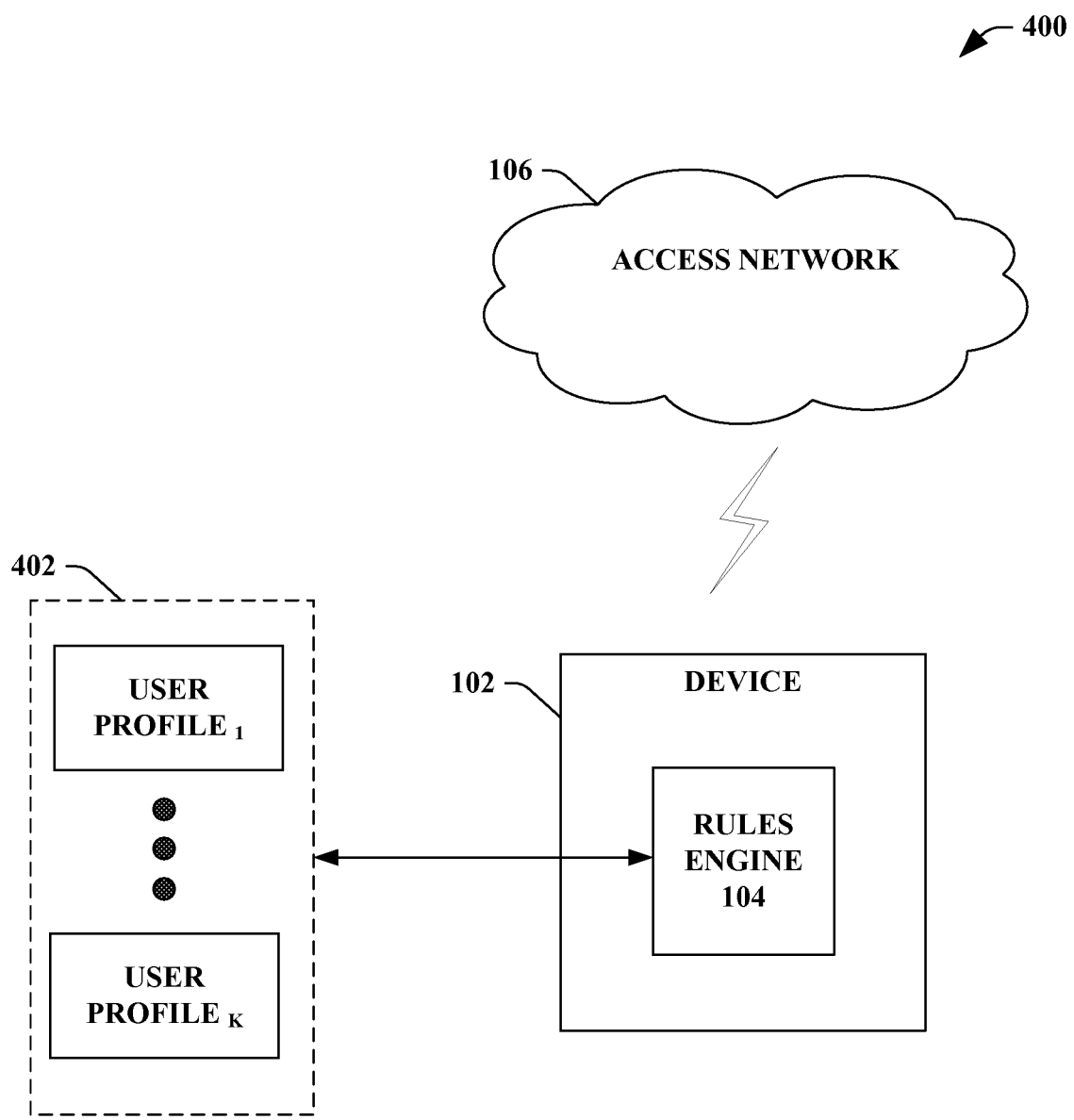
FIG. 4 illustrates a block diagram of an exemplary system that facilitates employing multiple profiles with respective rules for handover techniques.

FIG. 4 illustrates a system 400 that facilitates employing multiple profiles with respective rules for handover techniques. The system 400 can include the rules engine 104 in order to enable user-defined rules and policies for handoff in connection with the device 102 and at least one of the access network 106 or an access station (not shown). By leveraging a user input to create customized handoff or handover rules, the rules engine 104 can optimize handover by providing handoff in accordance with a user preference as well as conserving battery consumption. The system 400 can enhance the device 102 in finding an optimal wireless access interface in a hybrid network environment. The rules engine 104 can allow user feedback for a control loop of a handover mechanism, which can provide personalized handover services per user's choice regardless of costs, QoS, security sensitiveness, or any other suitable metric. Moreover, it is to be appreciated that the subject innovation can be utilized with any suitable Internet service providers, content providers, cellular providers, and the like.

FIG. 4 further depicts a user profile 402 that can be associated with at least one device 102. The rules engine 104 can enable a set of rules to be created for any suitable number of user profiles 402 for any suitable number of devices 102. For example, the system 400 can leverage any suitable number of user profiles 402, such as user profile $_1$ to user profile $_K$, where K is a positive integer. For example, a user can include multiple devices in which each device can include a respective corresponding user profile defining rules or policies for the specific device. For instance, a user can utilize a first profile with a first device having a first set of user-defined rules as well as a second profile with a second device having a second set of user-defined rules. It is to be appreciated that the user can employ a single set of rules to a plurality of devices (e.g., a set of user-defined rules that can apply to a first device, a second device, etc.). Moreover it is to be appreciated that the user profiles 402 can be based upon a user utilizing the device 102. For example, the device can be shared or utilized by more than one user, wherein each user can create a user profile that includes a set of user-defined rules for the device.

Figure 5:
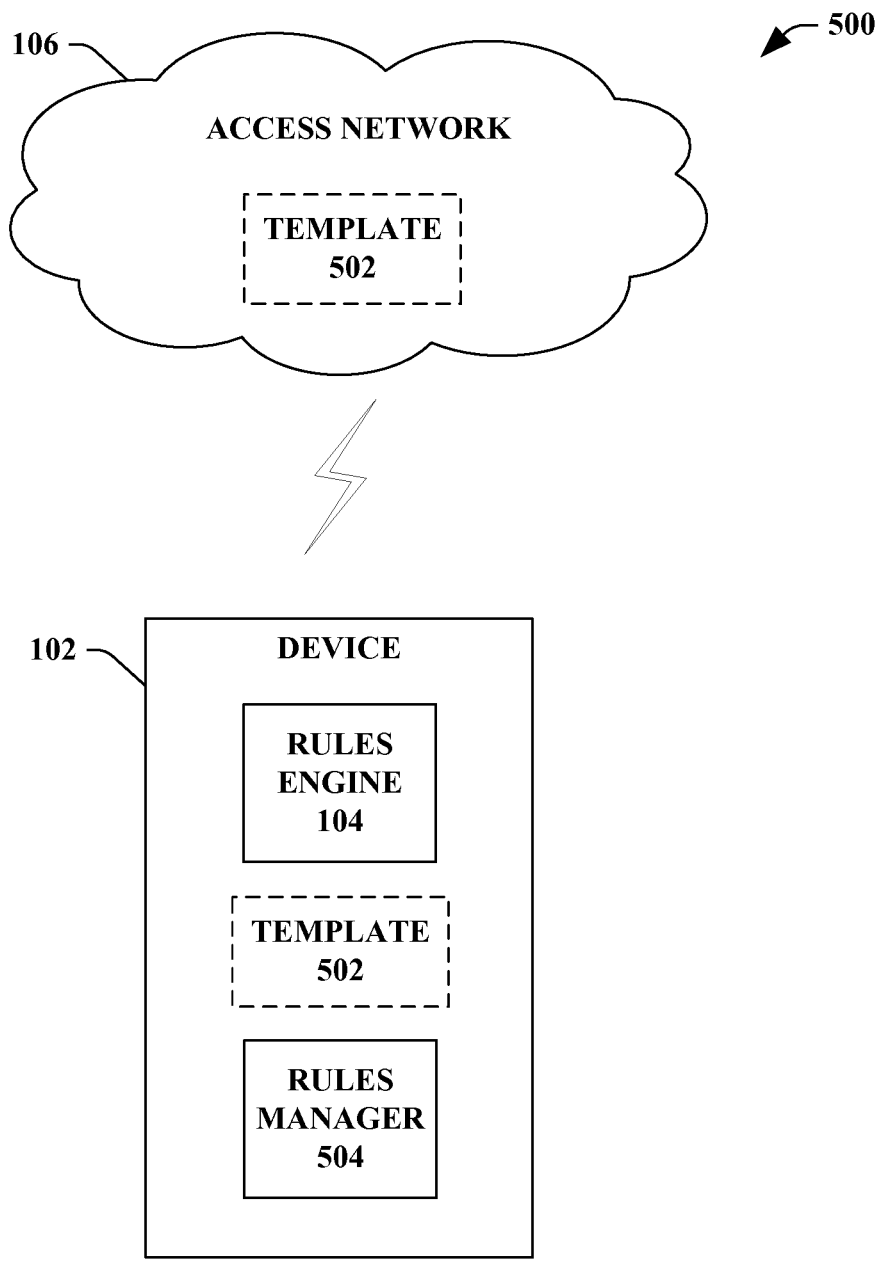
FIG. 5 illustrates a block diagram of exemplary system that facilitates enhancing handover mechanisms by enabling standardized templates to be customized in order for a seamless incorporation of user-defined rules for handover.

FIG. 5 illustrates a system 500 that facilitates enhancing handover mechanisms by enabling standardized templates to be customized in order for a seamless incorporation of user-defined rules for handover. The system 500 can include the rules engine 104 that can employ user-defined rules in combination with network-based handover policies and/or device-based handover policies. It is to be appreciated that the rules engine 104 can be utilized as a primary handover policy (e.g., without a network-based handover rule, without a device-based handover rule, etc.) or a policy in combination with any other suitable handover policies (e.g., disparate user-defined rules, device rules, network rules, access interface policies, application-based rules, etc.).

Within the scope of user-defined rules, network-based or device based approaches can switch one access interface to another type of access network for a lower connection fee. Moreover, since the user-defined rules can define disparate geographical locations to include or exclude different handover choices, the access network 106 and/or device 102 can determine when to turn on the monitoring function (e.g., to identify which access station or access network to connect or switch) which can translate to a great deal of batter power save since the device 102 does not need to monitor different access interfaces to keep track of signal quality. In other words, the monitoring function can be utilized when the rules permit in order to switch to another access network or access station.

The rules engine 104 can utilize a template 502 that can include standardized settings or configurations that can be utilized to create at least one user-defined handover rule. For instance, the template 502 can be provided for employment of a pre-defined handover rule, wherein such definition can be device-based, network-based, application-based, user-based (e.g., a rule template downloaded from a social network, community, web site, etc.), and/or any other suitable combination thereof In another example, the template 502 can be edited or manipulated in order to create a user-defined rule from the pre-defined aspects of the template 502. The template 502 can be from any suitable and verified entity such as, but not limited to, the access network 106, the device 102, a service provider, a content provider, the Internet, a cellular provider, a website, a forum, a web portal, a server, a network, a portion of software, a portion of an application, a corporation, an enterprise, a user, etc.

In an example, the template 502 can include pre-defined categories for which a set of rules can be created, wherein such categories can be based upon criteria such as geographic location, application type, billing cost, service cost, billing or service cost at a location, billing or service cost at a location and wireless network, network bandwidth, QoS quality, physical layer service quality (e.g., such as signal-to-noise ratio (SNR), etc.), handover quality and service impact with on-going applications, mobility of speed of wireless users, network traffic, cell site, wireless network coverage, channel security level, security settings, security requirements, power requirements (e.g., conserving battery power based on connecting with a lower power consuming network in comparison to another), comparison of service plans (e.g., data plan versus cellular plan, etc.), and/or any other suitable criteria a user can provide that relates to a personalized experience with the device 102. For instance, a geographic-based rule template can be utilized in which a user can specifically tailor such rule in accordance with his or her geographic areas, access stations, and/or access networks in relation to handover. In one example, the heterogeneous networks can be provided by the same service provider. In another example, the rules engine 104 can be provided by a service provider and provide manual overwrite function to the user and/or customer. In still another example, the rules engine 104 can be a service that can be customer-centric if the wireless services are from different service providers.

The rules engine 104 can further employ a rules manager 504 that can manage any handover or handoff rules associated with user-defined rules, the device 102, the access network 106, an access station, etc. The rules manager 504 can enable a template or a user-created rule to be editing, changed, created, deleted, etc. Moreover, the rules manager 504 can collect historic data (e.g., usage, geographic locations, rates, networks, etc.) related to the device 102, an application related to the device 102, the access network, or an access station. Based upon such historic data, the rules manager 504 can automatically create a user-specific rule for handoff. In addition, the rules manager 504 can update or adapt existing handoff rules based upon analysis of historic data. In other words, the rules manager 504 can merge user-defined rules with updates based upon historically collected experiences.

Figure 6:
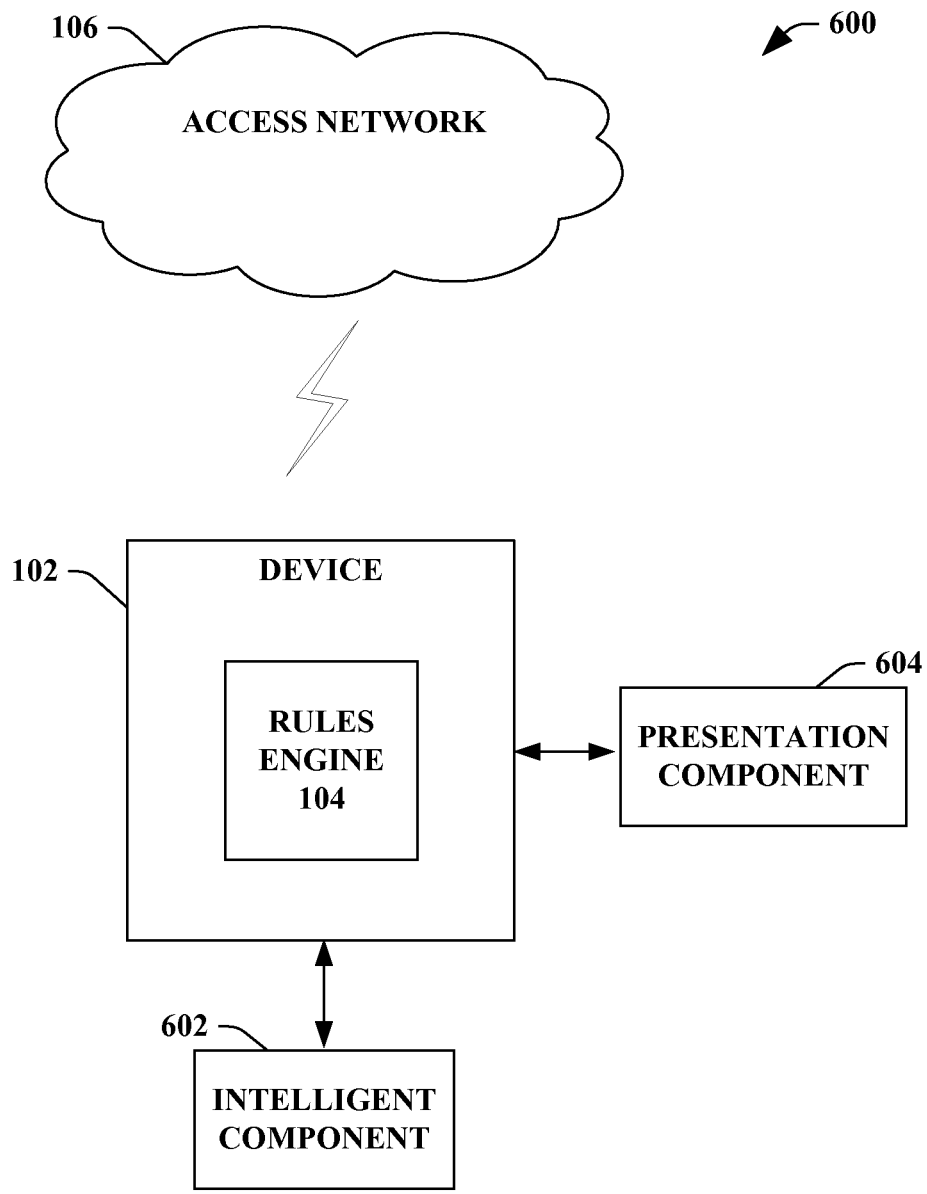
FIG. 6 illustrates a block diagram of an exemplary system that facilitates automatically inferring a user behavior or an application behavior in order to create a custom rule related to handover associated with a device and an access network.

FIG. 6 illustrates a system 600 that employs intelligence to facilitate automatically inferring a user behavior or an application behavior in order to create a custom rule related to handover associated with a device and an access network. The system 600 can include the device 102, the rules engine 104, and the access network 106 which can be substantially similar to respective engines, devices, and networks described in previous figures. The system 600 further includes an intelligent component 602. The intelligent component 602 can be utilized by the rules engine 102 to facilitate creating a user-defined rule that can be employed for handover or handoff within a wireless environment. For example, the intelligent component 602 can infer criteria related to user-defined rules, user preferences, device settings, access network configurations, access station settings, access network availability, access station availability, user-defined rules, user tendencies, connection tendencies, device tendencies, application tendencies, application requirements, geographic location, application type, billing cost, service cost, billing or service cost at a location, billing or service cost at a location and wireless network, network bandwidth, QoS quality, physical layer service quality, handover quality and service impact with on-going applications, mobility of speed of wireless users, network traffic, cell site, wireless network coverage, channel security level, security settings, security requirements, power requirements, comparison of service plans, etc.

The intelligent component 602 can employ value of information (VOI) computation in order to identify user-defined rules for handover according to criteria. For instance, by utilizing VOI computation, the most ideal and/or appropriate user-defined rules for handover can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The rules engine 102 can further utilize a presentation component 604 that provides various types of user interfaces to facilitate interaction between a user and any component coupled to the rules engine 102. The presentation component 604 can provide a user-friendly input interface to allow rich media input from a user. The presentation component 604 can be, but is not limited to being, a web portal, a downloadable stand-alone program, a web site, etc. The presentation component 604 can provide a geographic map as well as a set of assisting tools to help a user define a set of rules. For example, the user can select different locations (e.g., campus, home, company, mall, etc.) and define different rules. The user, for instance, can further select different applications and choose different handover metrics or criteria. In an additional example, a user can select different contact numbers or contact information (e.g., home number, cell number, email address, instant messenger alias, pager, assistant number, etc.) and assign or exclude different access interfaces. The presentation component 604 can further be a web-based program or tool.

As depicted, the presentation component 604 is a separate entity that can be utilized with the rules engine 102. However, it is to be appreciated that the presentation component 604 and/or similar view components can be incorporated into the rules engine 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the rules engine 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
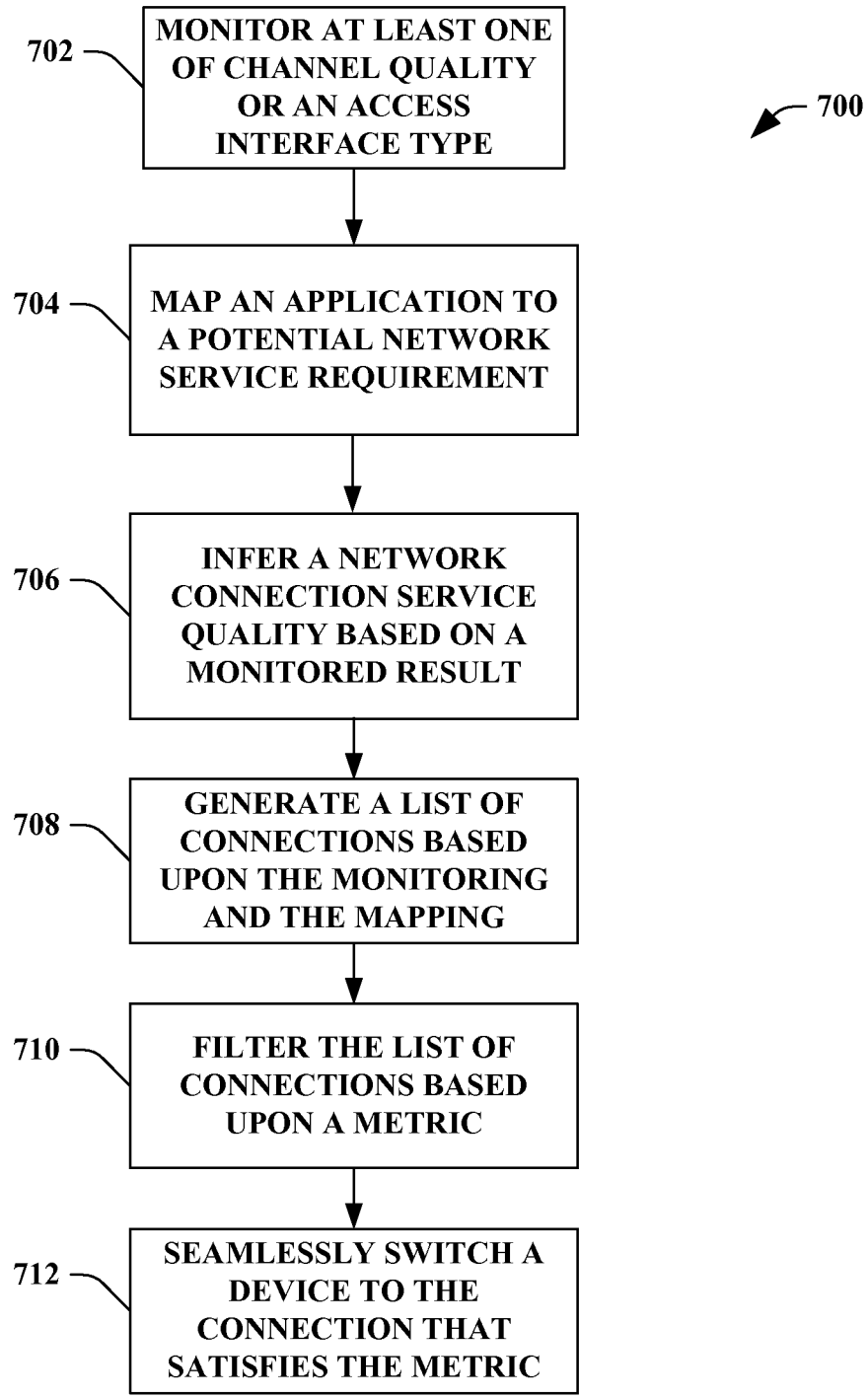
FIG. 7 illustrates an exemplary methodology for customizing handover associated with a device and a network based upon a user preference or an application requirement.
Figure 8:
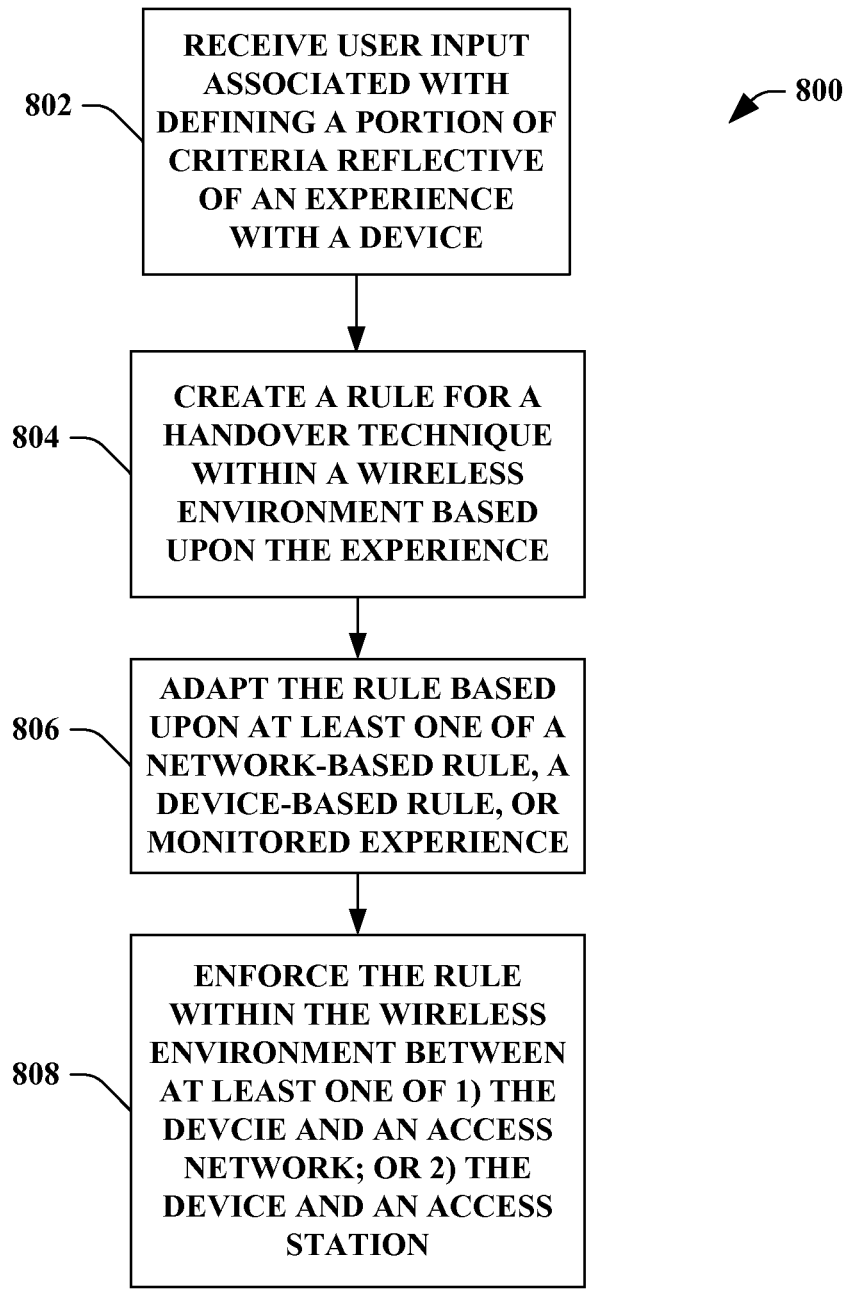
FIG. 8 illustrates an exemplary methodology that facilitates inferring a user behavior or an application behavior in order to create a custom rule related to handover associated with a device and an access network.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates customizing handover associated with a device and a network based upon a user preference or an application requirement. The method 700 can provide efficient and optimal handoff between a device, an access network, and/or an access station related to a wireless environment. At reference numeral 702, at least one of a channel quality or an access interface type can be monitored in real time. At reference numeral 704, an application can be mapped to a potential network service requirement. For example, an application can include a requirement for a bandwidth, a signal-to-noise ratio, latency, packet loss, etc. At reference numeral 706, a network connection service quality can be inferred based on a monitored result. At reference numeral 708, a list of connections can be generated based upon the monitoring and the mapping.

At reference numeral 710, the list of connections can be filtered based upon a metric. For example, the metric or criteria can be, but is not limited to being, geographic location, application type, billing cost, service cost, billing or service cost at a location, billing or service cost at a location and wireless network, network bandwidth, QoS quality, physical layer service quality (e.g., such as signal-to-noise ratio (SNR), etc.), handover quality and service impact with on-going applications, mobility of speed of wireless users, network traffic, cell site, wireless network coverage, channel security level, security settings, security requirements, power requirements (e.g., conserving battery power based on connecting with a lower power consuming network in comparison to another), comparison of service plans (e.g., data plan versus cellular plan, etc.), etc.

At reference numeral 712, a device can be seamlessly switched to the connection that satisfies the metric. In other words, handoff can be employed based upon the mapping of applications to the monitored connections and identifying a connection based upon the metric defined. It is to be appreciated that the metric can be defined by a user and an experience associated with the device. Moreover, the device 102 can be any suitable electronic device such as, but not limited to, a cellular phone, a mobile device, a portable digital assistant (PDA), a smartphone, a laptop, a gaming device, a portable gaming device, a media player, a portable media player, a web browser, a machine, a computer, a device with a processor and/or memory, a portable computing device, etc.

FIG. 8 illustrates a method 800 for inferring a user behavior or an application behavior in order to create a custom rule related to handover associated with a device and an access network. At reference numeral 802, user input associated with defining a portion of criteria reflective of an experience with a device can be received. For example, the experience can be related to device connectivity to an access network, device connectivity to an access station, device application resource requirement, device privacy requirements, etc.

At reference numeral 804, a rule for a handover technique within a wireless environment can be created based upon the criteria reflective of the experience. For example, the criteria can be geographic location, application type, billing cost, service cost, billing or service cost at a location, billing or service cost at a location and wireless network, network bandwidth, QoS quality, physical layer service quality (e.g., such as signal-to-noise ratio (SNR), etc.), handover quality and service impact with on-going applications, mobility of speed of wireless users, network traffic, cell site, wireless network coverage, channel security level, security settings, security requirements, power requirements (e.g., conserving battery power based on connecting with a lower power consuming network in comparison to another), comparison of service plans (e.g., data plan versus cellular plan, etc.), etc.

At reference numeral 806, the rule can be adapted based upon at least one of a network-based rule, a device-based rule, or a monitored experience. For example, a user can create a rule based on providing user input and such rule can be manipulated or updated based upon a network-based rule or policy. In another example, the rule can be adapted to conform to device-based handover rules. In still another example, the user-defined rule can be updated based upon historic data collected associated with an experience with the device (e.g., user provides input related to an experience and the monitoring of the experience provides a more clear definition for the rule).

At reference numeral 808, the rule can be enforced within the wireless environment between at least one of 1) the device and an access network; or 2) the device and an access station. In other words, the rule created from user input can facilitate handing off connectivity for the device and a component within a wireless mesh network (e.g., an access network, an access station, a base station, a hotspot, a wireless network, etc.). Thus, the rule created can manage connectivity for the device, wherein the device can be, but is not limited to being, any suitable electronic device, a cellular phone, a mobile device, a portable digital assistant (PDA), a smartphone, a laptop, a gaming device, a portable gaming device, a media player, a portable media player, a web browser, a machine, a computer, a device with a processor and/or memory, a portable computing device, etc.

Figure 9:
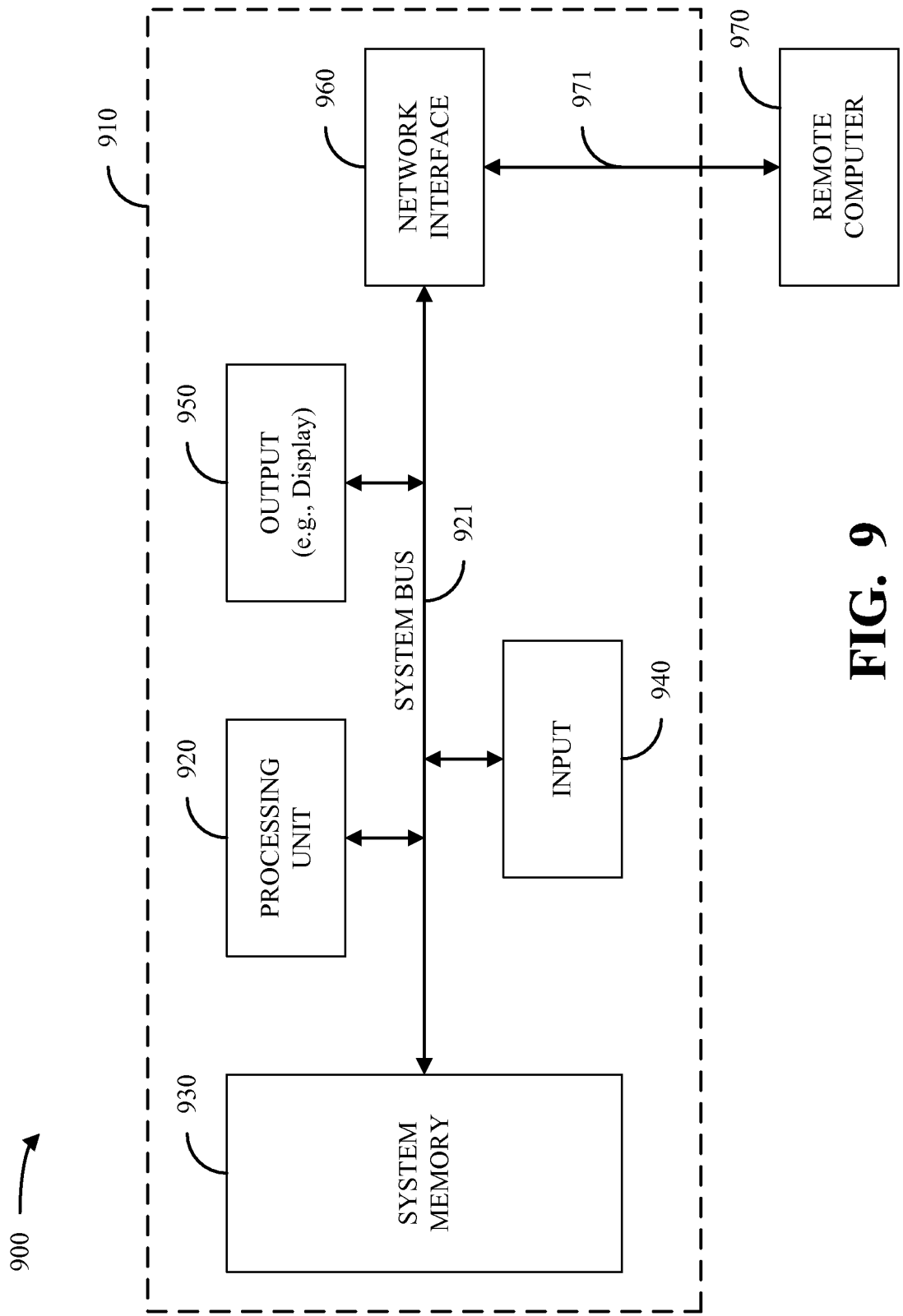
FIG. 9 is a block diagram of a computing system in which various aspects described herein can function.

In order to provide additional context for implementing various aspects of the claimed subject matter, FIG. 9 and the following discussion is intended to provide a brief, general description of a suitable computing environment in which the various aspects of the subject innovation may be implemented. For example, a rules engine can create personalized handoff rules for a mobile device and an access network based on user preference and/or application requirement, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Turning to FIG. 9, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a network can be desirably configured. Accordingly, the below general purpose computing system described below in FIG. 9 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 9 thus illustrates an example of a suitable computing system environment 900 in which the claimed subject matter can be implemented, although as made clear above, the computing system environment 900 is only one example of a suitable computing environment for a media device and is not intended to suggest any limitation as to the scope of use or functionality of the claimed subject matter. Further, the computing environment 900 is not intended to suggest any dependency or requirement relating to the claimed subject matter and any one or combination of components illustrated in the example operating environment 900.

With reference to FIG. 9, an example of a computing environment 900 for implementing various aspects described herein includes a general purpose computing device in the form of a computer 910. Components of computer 910 can include, but are not limited to, a processing unit 920, a system memory 930, and a system bus 921 that couples various system components including the system memory to the processing unit 920. The system bus 921 can be any of several types of bus structures including a memory bus or memory controller, a peripheral bus, and a local bus using any of a variety of bus architectures.

Computer 910 can include a variety of computer readable media. Computer readable media can be any available media that can be accessed by computer 910. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable, volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 921 through a non-removable memory interface such as an interface, and a magnetic disk drive or optical disk drive can be connected to the system bus 921 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 920 through user input 940 and associated interface(s) that are coupled to the system bus 921, but can be connected by other interface and bus structures, such as a parallel port, game port or a universal serial bus (USB). A graphics subsystem can also be connected to the system bus 921. In addition, a monitor or other type of display device can be connected to the system bus 921 via an interface, such as output interface 950, which can in turn communicate with video memory. In addition to a monitor, computers can also include other peripheral output devices, such as speakers and/or a printer, which can also be connected through output interface 950.

The computer 910 can operate in a networked or distributed environment using logical connections to one or more other remote computers, such as remote computer 970, which can in turn have media capabilities different from device 910. The remote computer 970 can be a personal computer, a server, a router, a network PC, a peer device or other common network node, and/or any other remote media consumption or transmission device, and can include any or all of the elements described above relative to the computer 910. The logical connections depicted in FIG. 9 include a network 971, such as a local area network (LAN) or a wide area network (WAN), but can also include other networks/buses. Such networking environments are commonplace in homes, offices, enterprise-wide computer networks, intranets and the Internet.

When used in a LAN networking environment, the computer 910 is connected to the LAN 971 through a network interface or adapter. When used in a WAN networking environment, the computer 910 can include a communications component, such as a modem, or other means for establishing communications over the WAN, such as the Internet. A communications component, such as a modem, which can be internal or external, can be connected to the system bus 921 via the user input interface at input 940 and/or other appropriate mechanism. In a networked environment, program modules depicted relative to the computer 910, or portions thereof, can be stored in a remote memory storage device. It should be appreciated that the network connections shown and described are non-limiting examples and that other means of establishing a communications link between the computers can be used.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
  a memory that stores computer-executable instructions; and
  at least one processor, communicatively coupled to the memory, that facilitates execution of the computer-executable instructions to at least:
    receive an input related to a criterion related to a user-defined quality of service requirement for an application running on a device at a location
    define a metric for a rule for a handover choice for the application running on the device at the location based on the input;
    monitor a plurality of channel qualities corresponding to a plurality of channels within the wireless environment at the location;
    map the application running on the device to potential channels from the plurality of channels based on a network quality of service requirement;
    determine a quality of service for the potential channels based on the plurality of channel qualities;
    generate the list of potential connections based on the quality of service for the potential connections;
    filter a connection for handover for the application running on the device at the location from the list of potential connections based on the metric; and
    switch the device to the connection that satisfies the metric.

2. The system of claim 1, wherein the rule for the handover choice at the location is further based on a resource requirement for the device related to the user-defined quality of service requirement.

3. The system of claim 1, wherein the at least one processor further facilitates the execution of the computer-executable instructions to compare the rule to a network-based rule for the handover choice and prevent a conflict between the rule and the network-based rule.

4. The system of claim 1, wherein the at least one processor further facilitates the execution of the computer-executable instructions to enable access to the rule to modify the rule.

5. The system of claim 4, wherein the at least one processor further facilitates the execution of the computer-executable instructions to collect data related to a quality of service experience with the device at the location and update the rule based upon an analysis of the data.

6. The system of claim 4, wherein the at least one processor further facilitates the execution of the computer-executable instructions to generate a template with a standardized configuration related to a handover technique according to the rule for the handover choice.

7. The system of claim 4, wherein the at least one processor further facilitates the execution of the computer-executable instructions to enable access to equipment of a user for editing the rule.

8. The system of claim 4, wherein the at least one processor further facilitates the execution of the computer-executable instructions to enable access to an access network editing the rule.

9. The system of claim 1, wherein the input is from user equipment executed by the application.

10. The system of claim 1, wherein the at least one processor further facilitates the execution of the computer-executable instructions to create a second rule based on a service plan of a user and further defines the metric based on the second rule.

11. The system of claim 1, wherein the at least one processor further facilitates the execution of the computer-executable instructions to create a third rule based on a behavior of a user and further defines the metric based on the third rule.

12. The system of claim 1, wherein the at least one processor further facilitates the execution of the computer-executable instructions to determine a fourth rule based on an evaluation of historical data specific to a user.

13. A method, comprising:
  receiving an input, by a system including at least one processor, defining a criterion related to a user-defined quality of service requirement for a location related to an application running on a device that exchanges data with a wireless environment;
  creating, by the system, a rule for a handover technique within the wireless environment for the location based on the input;

monitoring, by the system, a plurality of channel qualities corresponding to a plurality of channels within the wireless environment at the location;

mapping, by the system, the application running on the device to potential channels from the plurality of channels based on a network quality of service requirement;

determining, by the system, a quality of service for potential channels available at the location;

generating, by the system, a list of connections satisfying a network quality of service requirement based on the determining;

filtering, by the system, the list of connections based on a metric related the rule; and switching, by the system, the device to the connection satisfying the metric.

14. The method of claim 13, wherein the receiving further comprises receiving the input from equipment of a user.

15. The method of claim 14, wherein the receiving further comprises receiving the input from the equipment of the user related to a quality of service preference related to the application for the location.

16. The method of claim 13, wherein the switching further comprises switching the device to the connection satisfying the metric without interrupting service to the device.

17. The method of claim 13, further comprising monitoring an access interface type associated with the wireless environment.

18. The method of claim 17, further comprising mapping the application to the network quality of service requirement.

19. A non-transitory computer readable medium having computer instructions stored thereon that, in response to execution, cause a computing device, including at least one processor, to perform operations, comprising:

receiving an input defining a criterion related to a user-defined quality of service requirement for a location related to an application running on a device that exchanges data with a wireless environment;

creating a rule for a handover technique within the wireless environment for the location based on the input;

monitoring a plurality of channel qualities corresponding to a plurality of channels within the wireless environment at the location;

mapping the application to potential channels from the plurality of channels based on a network quality of service requirement;

determining a quality of service for the potential channels at the location based on the plurality of channel qualities;

generating a list of potential connections satisfying a network quality of service requirement based on the determining;

filtering the list of connections based on a metric related the rule; and switching the device to the connection satisfying the metric.

* * * * *